US009645665B2

(12) United States Patent
Sun et al.

(10) Patent No.: US 9,645,665 B2
(45) Date of Patent: May 9, 2017

(54) IN-CELL TOUCH PANEL AND DISPLAY DEVICE

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Jian Sun, Beijing (CN); Cheng Li, Beijing (CN); Xuelu Wang, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 158 days.

(21) Appl. No.: 14/371,080

(22) PCT Filed: Dec. 17, 2013

(86) PCT No.: PCT/CN2013/089735
§ 371 (c)(1),
(2) Date: Jul. 8, 2014

(87) PCT Pub. No.: WO2014/190736
PCT Pub. Date: Dec. 4, 2014

(65) Prior Publication Data
US 2015/0309644 A1     Oct. 29, 2015

(30) Foreign Application Priority Data
May 31, 2013    (CN) .......................... 2013 1 0214940

(51) Int. Cl.
G06F 3/041     (2006.01)
G06F 3/044     (2006.01)
(Continued)

(52) U.S. Cl.
CPC ............ *G06F 3/0416* (2013.01); *G06F 3/044* (2013.01); *G06F 3/045* (2013.01); *G06F 3/0412* (2013.01);
(Continued)

(58) Field of Classification Search
CPC ........ G06F 3/041; G06F 3/044; G09G 3/3659
(Continued)

(56) References Cited

U.S. PATENT DOCUMENTS 8,792,062 B2 *    7/2014   Hwang ................... G06F 3/044
                                                      178/18.01
2011/0157039 A1 *   6/2011   Shin ..................... G02F 1/13338
                                                      345/173
(Continued)

FOREIGN PATENT DOCUMENTS

CN         102650775 A     8/2012
CN         102968231 A     3/2013
(Continued)

OTHER PUBLICATIONS

International Search Report Appln. No. PCT/CN2013/089735; Dated Mar. 27, 2014.
(Continued)

Primary Examiner — Calvin C Ma
(74) Attorney, Agent, or Firm — Ladas & Parry LLP

(57) ABSTRACT

The present invention discloses an in-cell touch panel and a display device to improve the opening rate of the in-cell touch panel. The in-cell touch panel provided by the embodiment of the present invention comprises a first substrate and a second substrate opposite to each other, a black matrix layer and a color resin layer located at the side of the first substrate close to the second substrate, and a pixel array located at the side of the second substrate close to the first substrate, and further comprises a plurality of first electrodes
(Continued)

located on the first substrate or the second substrate and extending in a first direction and a plurality of second electrodes extending in a second direction crossing the first direction; the first electrodes and the second electrodes are disposed at the same layer and insulated from each other; the first electrodes comprise a plurality of electrode units independent of each other, the electrode units and the second electrodes are arranged with an interval therebetween, and two electrode units which belong to the same first electrode and are located at two sides of the second electrodes are electrically connected through a bridge line.

21 Claims, 6 Drawing Sheets

(51) Int. Cl.
  *G06F 3/045* (2006.01)
  *G09G 3/20* (2006.01)
(52) U.S. Cl.
  CPC ... *G09G 3/2003* (2013.01); *G09G 2300/0426* (2013.01); *G09G 2300/0452* (2013.01); *G09G 2300/0876* (2013.01); *G09G 2340/0457* (2013.01)
(58) Field of Classification Search
  USPC .................................................. 345/92, 174
  See application file for complete search history.

(56) References Cited

U.S. PATENT DOCUMENTS

| | | |
|---|---|---|
| 2012/0262414 A1 | 10/2012 | Lai |
| 2012/0274603 A1* | 11/2012 | Kim ..................... G06F 3/0412 345/174 |
| 2012/0307185 A1 | 12/2012 | Wang |
| 2014/0168154 A1 | 6/2014 | Wang et al. |

FOREIGN PATENT DOCUMENTS

| | | |
|---|---|---|
| CN | 103034366 A | 4/2013 |
| CN | 103049156 A | 4/2013 |
| CN | 202870793 U | 4/2013 |
| CN | 103294273 A | 9/2013 |
| CN | 203299777 U | 11/2013 |

OTHER PUBLICATIONS

Written Opinion of the International Searching Authority Appln. No. PCT/CN2013/089735; Dated Mar. 27, 2014.
First Chinese Office Action Appln. No. 201310214940.6; Dated Aug. 4, 2015.
Second Chinese Office Action Appln, No, 201310214940.6: Dated Oct. 28, 2016.

* cited by examiner

IN-CELL TOUCH PANEL AND DISPLAY DEVICE

TECHNICAL FIELD

The embodiment of the present invention relates to an in-cell touch panel and a display device.

BACKGROUND

An in-cell touch panel is a touch display panel integrating a touch panel and a display panel, that is, touch driving electrodes and touch sensing electrodes are integrated in the display panel. The in-cell touch panel can achieve the functions of touch and image display at the same time. As the in-cell touch panel has features of simple structure, being light and thin, low cost and etc., it has been the mainstream in the technical field of display.

In in-cell touch technologies, common touch driving electrodes and touch sensing electrodes are electrodes parallel to gate scan lines and electrodes parallel to data signal line, which are added in the region corresponding to an array substrate and a black matrix. Specifically, referring to FIG. 1, it shows an existing in-cell touch panel, comprising: a plurality of laterally distributed gate scan lines 10, a plurality of longitudinally distributed data signal lines 20, and sub-pixel units formed by the surrounding of the gate scan lines 10 and the data signal lines 20. The red sub-pixel unit (R), the green sub-pixel unit (G) and the blue sub-pixel unit (B) are as shown in FIG. 1. The plurality of sub-pixel units are arranged in a matrix. The in-cell touch panel further comprises a touch driving electrode 30 between two adjacent sub-pixel units and parallel to the gate scan lines 10 and a touch sensing electrode 40 between two adjacent sub-pixel units and parallel to the data signal lines 20.

As the touch driving electrode 30 and the touch sensing electrode 40, and the gate scan lines 10, and the data signal line 20 are formed through the same process, the touch driving electrode 30 and the touch sensing electrode 40 are opaque electrodes and located in a non-display area between adjacent sub-pixel units.

For the in-cell touch panel shown in FIG. 1, the gate scan lines and the touch driving electrode need to keep a certain distance therebetween to ensure mutual insulation, and the data signal lines and the touch sensing electrode need to keep a certain distance therebetween to ensure mutual insulation. Therefore, the opening rate of the sub-pixel units is low.

SUMMARY

The embodiments of the present invention provide an in-cell touch panel and a display device, to improve the opening rate of the in-cell touch panel.

The in-cell touch panel provided by the embodiments of the present invention comprises a first substrate and a second substrate opposite to each other, and further comprises a plurality of first electrodes which extend in a first direction and are located at a side of the first substrate close the second substrate or at a side of the second substrate close to the first substrate, and a plurality of second electrodes which extend in a second direction crossing the first direction; the first electrodes and the second electrodes are disposed at the same layer and insulated from each other; wherein, the first electrodes comprise a plurality of electrode units independent of each other, the electrode units and the second electrodes are arranged with an interval therebetween, and two electrode units which belong to the same first electrode and are located at two sides of the second electrodes are electrically connected through a bridge line.

For example, the touch panel further comprises a black matrix layer and a color resin layer located at the side of the first substrate close to the second substrate, and the first electrodes and the second electrodes are located between the first substrate and the black matrix layer, or between the black matrix layer and the color resin layer, or on the color resin layer.

For example, the touch panel further comprises a black matrix located at the side of the first substrate close to the second substrate, and the bridge line is located in a region corresponding to the black matrix.

For example, the first electrodes are touch driving electrodes, the second electrodes are touch sensing electrodes, and the electrode units of the first electrodes are touch driving electrode units; or, the first electrodes are touch sensing electrodes, the second electrodes are touch driving electrodes, and the electrode units of the first electrodes are touch sensing electrode units.

For example, the first electrodes and/or the second electrodes are provided with a plurality of strip-shaped metal electrodes.

For example, the touch panel further comprises a black matrix located at the side of the first substrate close to the second substrate, and the strip-shaped metal electrodes are located in the region corresponding to the black matrix.

For example, the strip-shaped electrodes are aluminum, molybdenum, silver and platinum electrodes, or electrodes made of an alloy of at least two metals from aluminum, molybdenum, silver and platinum.

For example, the first electrodes and the second electrodes are disposed on the first substrate, the touch panel further comprises common electrodes disposed on the first substrate, and the first electrodes and/or the second electrodes serve as common electrodes; or, the first electrodes and the second electrodes are disposed on the second substrate, the touch panel further comprises common electrodes disposed on the second substrate, and the first electrodes and/or the second electrodes serve as common electrodes.

For example, the touch panel further comprises a black matrix located at the side of the first substrate close to the second substrate, and the black matrix comprises a first portion distributed in a first direction and a second portion distributed in a second direction; the first portion or the second portion of the black matrix can be conductive; the first electrodes are the first portion of the conductive black matrix; or the second electrodes are the second portion of the conductive black matrix.

The embodiments of the present invention further provide a display device comprising the above touch panel.

The in-cell touch panel provided by the embodiments of the present invention has following features, that is, the first electrodes and the second electrodes for achieving the touch function are provided on a color filter substrate and are disposed at the same layer, the first electrodes (touch driving electrodes or touch sensing electrodes) comprise a plurality of electrode units independent of each other, and two adjacent electrode units which belong to the same first electrode are electrically connected through a bridge line. Therefore, the present invention prevents the first electrodes and/or the second electrodes for achieving the touch function from affecting the pixel structure on the array substrate, and prevents the first electrodes and/or the second electrodes from affecting the opening rate of the pixels.

DETAILED DESCRIPTION

Figure 1:
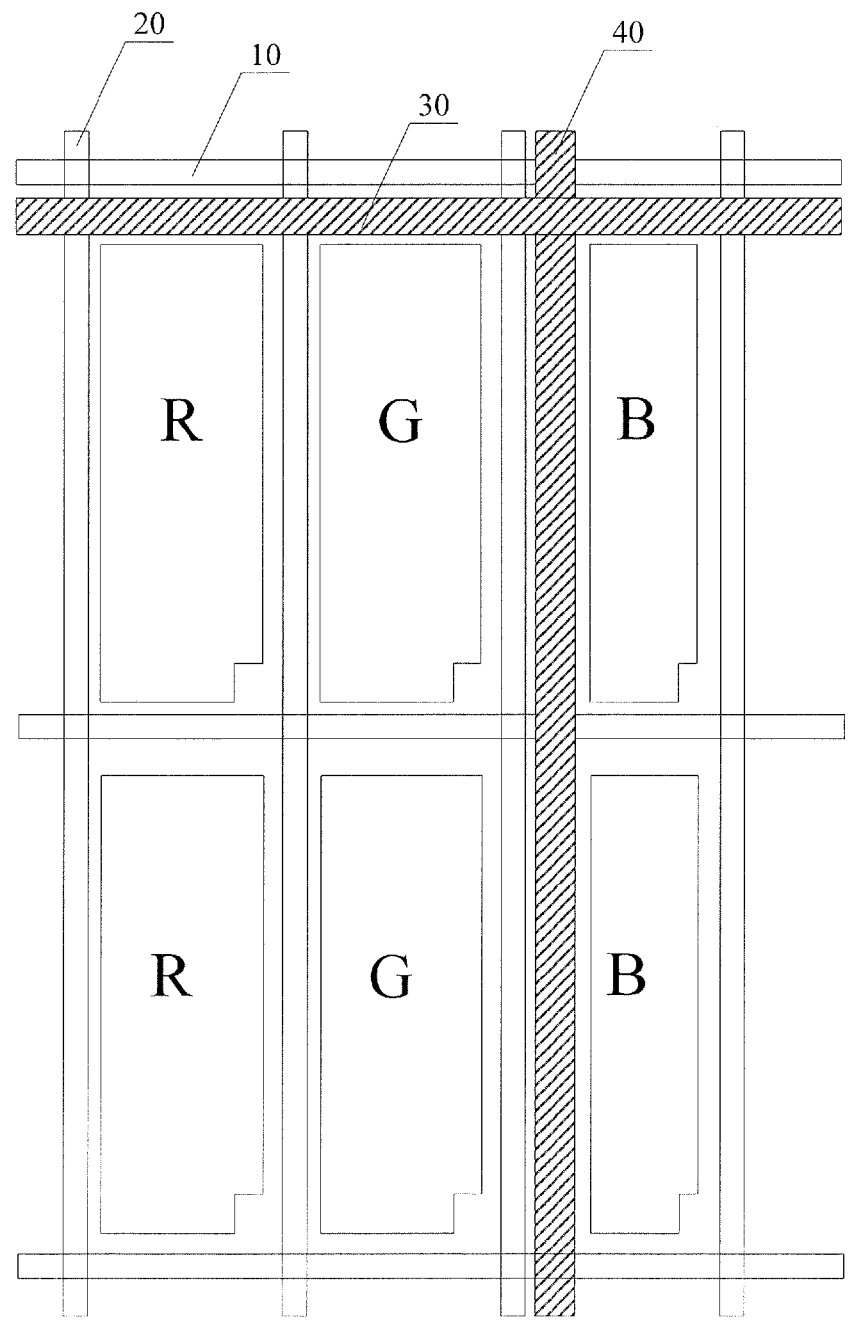
FIG. 1 is a schematic diagram of the structure of an existing in-cell touch panel.

The embodiments of the present invention provide an in-cell touch panel and a display device to improve the opening rate of the in-cell touch panel.

The working principle of the in-cell touch panel will be first briefed hereinafter.

The capacitance formed between electrode arrays crossing each is called a projected capacitance, also called a coupling capacitance. When a finger touches the touch panel, the finger changes the coupling capacitance between adjacent electrodes. Therefore, the position of the touch point can be determined through detecting the value of the changes of the coupling capacitance at the touch point.

In the touch panel provided by the embodiment of the present invention, the touch driving electrodes and the touch sensing electrodes are provided on the color filter substrate or the array substrate with a single-face bridging design (that is, the touch driving electrodes and the touch sensing electrodes are provided at the same layer, and disconnected electrodes are connected in a manner of bridging). When the touch driving electrodes and the touch sensing electrodes are provided on the array substrate, they are located at a different layer with gate lines or data lines. Such a design has advantages including that the touch driving electrodes and the touch sensing electrodes do not affect the opening rate of the pixels on the array substrate, and the thickness of the touch panel is reduced as the touch driving electrodes and the touch sensing electrodes are disposed at the same layer.

The in-cell touch panel provided by the embodiment of the present invention comprises a first substrate and a second substrate opposite to each other, and further comprises a plurality of first electrodes which extend in a first direction and are located at the side of the first substrate close to the second substrate or at the side of the second substrate close to the first substrate, and a plurality of second electrodes which extend in a second direction crossing the first direction. The first electrodes and the second electrodes are disposed at the same layer and insulated from each other.

The first electrodes comprise a plurality of electrode units independent of each other, the electrode units and the second electrodes are arranged with an interval therebetween, and two electrode units which belong to the same first electrode and are located at two sides of the second electrodes are electrically connected through a bridge line.

For example, the first substrate or the second substrate is a color filter substrate or an array substrate. In the embodiments of the present invention description is made with the first substrate as a color filter substrate.

The technical solutions provided by the embodiments of the present invention will be detailed hereinafter through drawings.

It needs to be indicated that the touch driving electrodes and the touch sensing electrodes provided by the embodiments of the present invention can all be disposed on the color filter substrate or on the array substrate.

Figure 3:
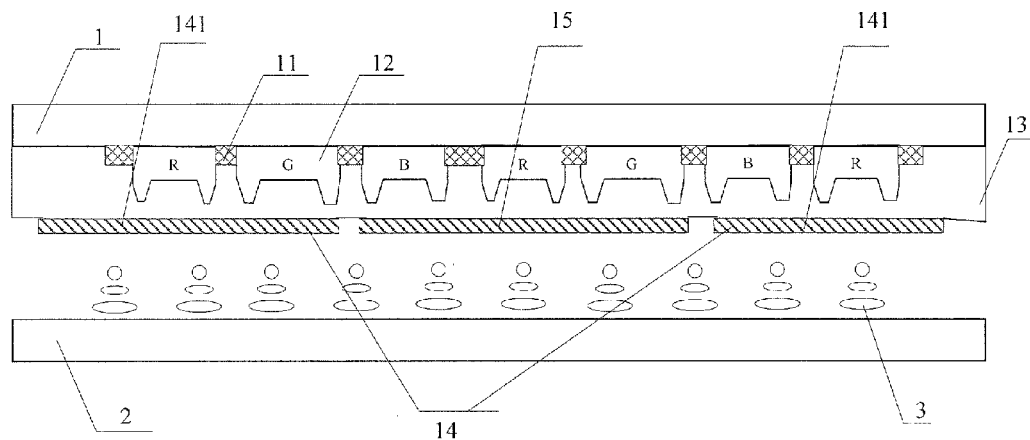
FIG. 3 is a section diagram of the in-cell touch panel shown in FIG. 2 in direction A-A'.

The touch driving electrodes and the touch sensing electrodes in the present invention can be embedded in a liquid crystal display panel (LCD), or in an organic electroluminescence display (OLED) panels. FIG. 3 shows the in-cell touch panel taking LCD as an example.

Description is first made as follow taking it as an example that the touch driving electrodes and the touch sensing electrodes are disposed on the color filter substrate of the LCD.

Figure 2:
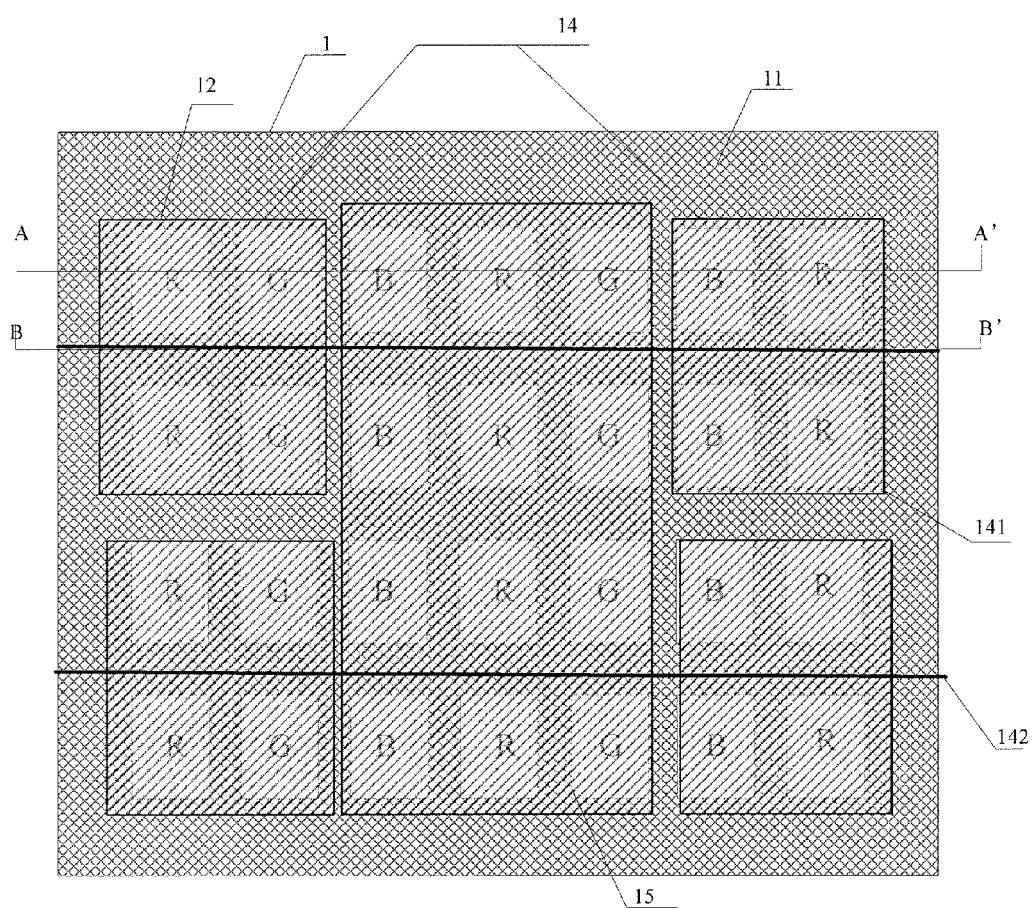
FIG. 2 is a top schematic diagram of the in-cell touch panel provided by the embodiment of the present invention.

Referring to FIG. 2, it is a top view of the in-cell touch panel provided by the embodiment of the present invention. The in-cell touch panel as shown comprises a first substrate 1 and a second substrate opposite to each other, and a liquid crystal layer between the first substrate 1 and the second substrate, and FIG. 2 does not show the second substrate and the liquid crystal layer.

The first substrate 1 is provided with a plurality of color resin layers 12 corresponding to sub-pixel units, for example, red sub-pixel units (R), green sub-pixel units (G) and blue sub-pixel units (B). The in-cell touch panel further comprises a black matrix 11 arranged in a matrix, a plurality of first electrodes 14 which extend in a first direction (the lateral direction shown in FIG. 2) and are located at the first substrate 1, and a plurality of second electrodes 15 which extend in a second direction (the longitudinal direction shown in FIG. 2) crossing the first direction. The first electrodes 14 and the second electrodes 15 are disposed at the same layer and insulated from each other. The first electrodes 14 comprise a plurality of electrode units 141 independent of each other, and two electrode units 141 located at two sides of the second electrodes 15 are electrically connected through a bridge line 142.

For example, the first electrodes are touch driving electrodes, and the second electrodes are touch sensing electrodes; or, the first electrodes are touch sensing electrodes, and the second electrodes are touch driving electrodes.

The first direction is perpendicular to the second direction. The first direction can be a lateral direction, and the second direction can be a longitudinal direction; or, the first direction can be a longitudinal direction, and the second direction can be a lateral direction.

The in-cell touch panel provided by the embodiments of the present invention will be specifically described hereinafter taking it as an example that the first electrodes are touch driving electrodes and the second electrodes are touch sensing electrodes.

Referring to FIG. 3, it is a section diagram of the in-cell touch panel shown in FIG. 2 in direction A-A'. As shown in the drawing, the in-cell touch panel comprises: the first substrate 1 and the second substrate 2 opposite to each other, the liquid crystal layer 3 between the first substrate 1 and the second substrate 2, the black matrix 11 and the color resins 12 (the R, G, B resin layers in FIG. 3) located at the side of the first substrate 1 close to the liquid crystal layer 3, and a flat layer 13 on the black matrix 11 and the color resins 12.

The black matrix and the color resins can be disposed at the same layer or at different layers.

For example, the first electrodes and the second electrodes can be located between any two film layers serving an insulating function on the first substrate. For example, the first electrodes and the second electrodes are located between the first substrate and the black matrix layer; or between the black matrix layer and the color resin layers; or between the color resin layers and the flat layer; or on the flat layer.

For the in-cell touch panel shown in FIG. 3, wherein, the black matrix 11 and the color resins 12 are disposed at the same layer, and the touch driving electrodes 14 and the touch sensing electrodes 15 are disposed on the same layer and insulated from each other, and are located on the flat layer 13. The touch driving electrodes 14 comprise a plurality of touch driving electrode units 141 independent of each other, and the touch driving electrode units 141 and the touch sensing electrodes 15 are arranged with an interval therebetween. Two touch driving electrode units 141 which belong to the same touch driving electrode 14 and are located at two sides of the touch sensing electrodes 15 are electrically connected through a bridge line (not shown in FIG. 3).

Figure 4:
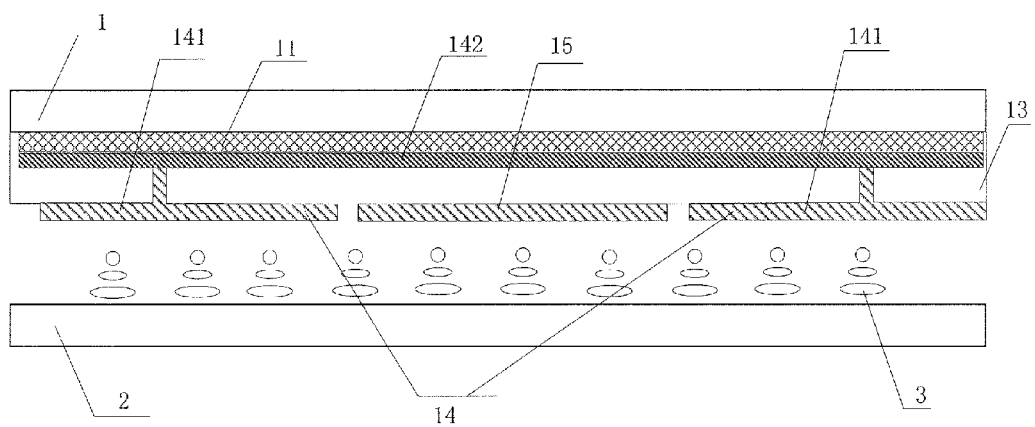
FIG. 4 is a section diagram of the in-cell touch panel shown in FIG. 2 in direction B-B'.

It needs to be indicated that, in this embodiment (the in-cell touch panel shown in FIGS. 2 and 3), the first substrate is provided with a flat layer. However, during specific implementation, the in-cell touch panel may not be provided with the flat layer. Referring to FIG. 4, it is a section diagram of the in-cell touch panel shown in FIG. 2 in direction B-B'. As shown in the drawing, the in-cell touch panel comprises: the first substrate 1, the black matrix 11 on the first substrate 1, and the bridge line 142 on the black matrix 11; the flat layer 13 on the bridge line 142, and the touch driving electrodes 14 and the touch sensing electrodes 15 on the flat layer 13.

Via holes are provided in the region on the flat layer 13 corresponding to the bridge line 142 and the touch driving electrode units 141, and the touch driving electrode units 141 of the touch driving electrodes 14 are electrically connected through the via holes.

Figure 5:
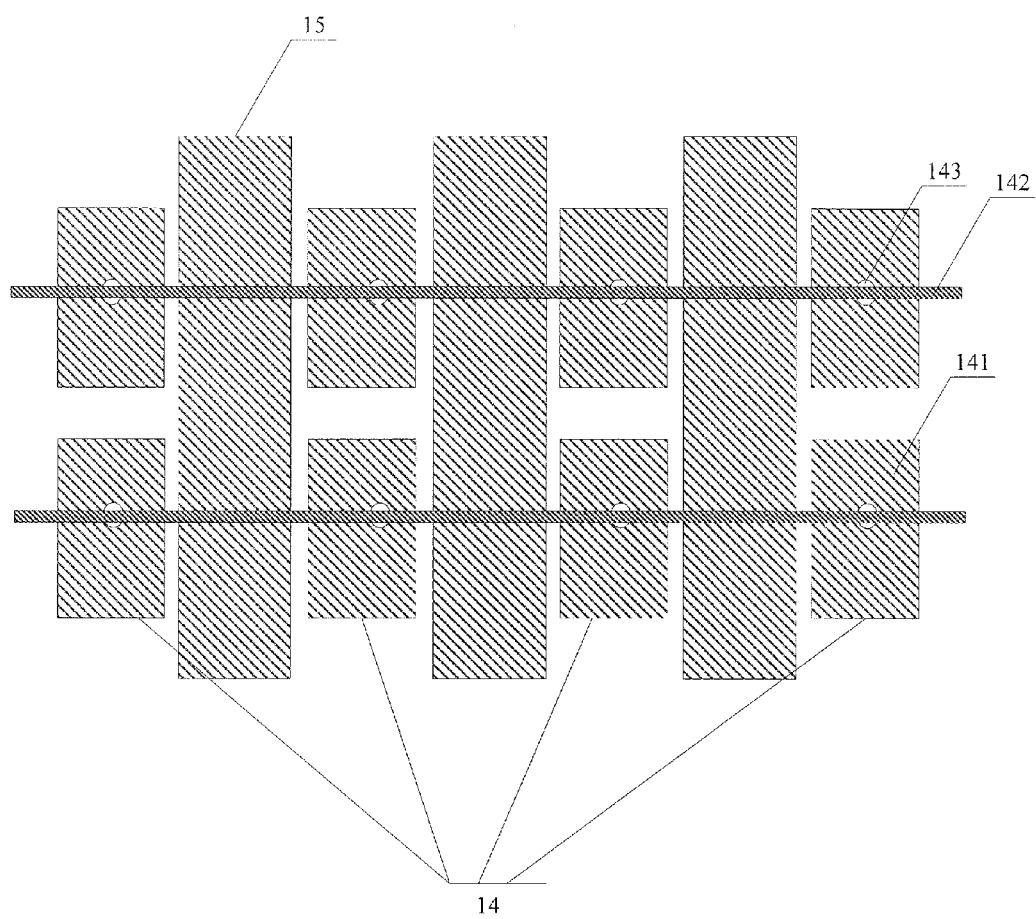
FIG. 5 is a schematic diagram of the structure of the touch driving electrodes and the touch sensing electrodes in the in-cell touch panel shown in FIG. 2.

FIG. 5 is a schematic diagram of the touch driving electrodes 14 and the touch sensing electrodes 15 provided by the embodiment of the present invention, and the connection relationship between them and the bridge line 142.

The touch driving electrode units 141 of each touch driving electrode 14 are electrically connected with each other through the bridge line 142. The touch driving electrode units 141 and the bridge line 142 are located at different layers and are connected through the via holes 143 shown in FIG. 5. The bridge line 142 is insulated from the touch sensing electrodes 15.

It needs to be indicated that the bridge line and the touch driving electrodes and the touch sensing electrodes provided by the embodiment of the present invention are located at different layers. It can be understood that they can be located between two adjacent film layers insulated from each other. The bridge line can be disposed at the same layer with the black matrix.

Figure 6:
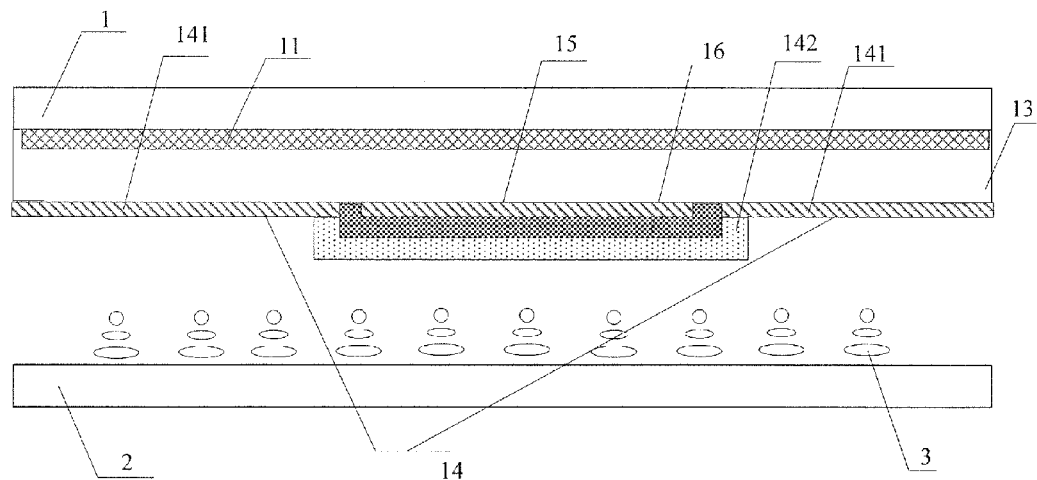
FIG. 6 is a schematic diagram of the structure of the in-cell touch panel provided by the embodiment of the present invention in which the bridge line is provided on the touch driving electrodes and the touch sensing electrodes.

The bridge line 142 shown in FIG. 5 can be located between the black matrix 11 and the flat layer 13 shown in FIG. 4. The black matrix 11 is a non-conductive insulating layer. The bridge line 142 can also be disposed above the touch driving electrodes 14 and the touch sensing electrodes 15, and is insulated from the touch sensing electrodes 15. The corresponding manner of arranging the touch panel is shown in FIG. 6. The touch panel shown in FIG. 6 and the touch panel shown in FIG. 3 or 4 have similar structures with the difference that the bridge line 142 is located above the touch driving electrodes 14 and the touch sensing electrodes 15 and is insulated from the touch sensing electrodes 15 through the insulating layer 16.

Preferably, for the touch panel shown in FIG. 4 or 6, the width of the bridge line 142 is not larger than that of the black matrix 11.

Preferably, for the touch panel shown in FIG. 4 or 6, the bridge line 142 is located in the region corresponding to the black matrix 11. That is, the projection of the bridge line 142 on the second substrate 2 is within the projection of the black matrix 11 on the second substrate 2.

As the bridge line 142 can be a transparent conductive line or an opaque electrode line and is located in the region corresponding to the larger-sized black matrix 11, the process is easier, thus the opening rate of the pixels is not affected, and light transmittance is not affect, either.

Preferably, the slit keeping the insulation between the touch driving electrode units 141 and the touch sensing electrodes 15 shown in FIG. 5 is located in the region corresponding to the black matrix. This arrangement does not affect the opening rate of the pixels, and does not affect the light transmittance in the pixel display area, either.

Preferably, the first electrodes and the second electrodes are transparent conductive electrodes, for example, they can be, but not limited to, indium tin oxide ITO or indium zinc oxide IZO conductive electrodes and etc.

The bridge line can be, but not limited to, an ITO or IZO electrode, or a metal electrode, for example, an aluminum, molybdenum, silver and platinum electrode, or an electrode made of an alloy of at least two metals from aluminum, molybdenum, silver and platinum.

The touch driving electrodes (or touch sensing electrodes) provided by the embodiments of the present invention comprise a plurality of touch driving electrode units (or touch sensing electrode units) independent of each other. However, the resistance of the touch driving electrodes (or touch sensing electrodes) will be increased due to the connection with the bridge line, which does not help improve the touch effect of the touch panel. To reduce the resistance of the touch driving electrodes and improve the conductivity thereof, for the touch panel provided by the embodiments of the present invention, strip-shaped metal electrodes with fine conductivity can be disposed on the touch driving electrodes or the touch sensing electrodes, or strip-shaped metal electrodes with fine conductivity can be disposed on the touch driving electrodes and the touch sensing electrodes.

As the metal electrodes have better conductivity than metal oxide conductive electrodes, the touch driving electrodes and the touch sensing electrodes with fine conductivity help improve the touch effect of the touch panel.

Figure 7:
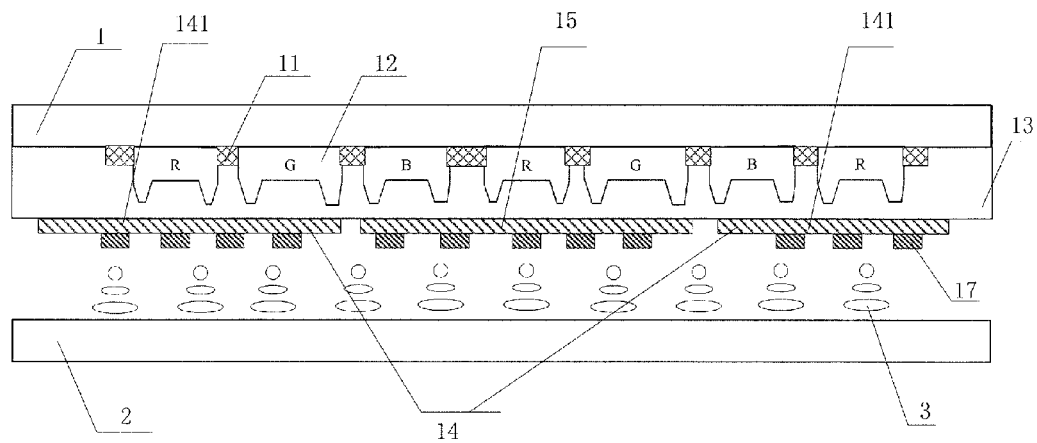
FIG. 7 is a schematic diagram of the structure of the in-cell touch panel shown in FIG. 3 in which the touch driving electrodes and the touch sensing electrodes are provided with metal electrodes.

That is, strip-shaped metal electrodes are disposed on the touch panel shown in FIG. 3 or 4. The structure of the touch panel is shown in FIG. 7, wherein a plurality of strip-shaped metal electrodes 17 are disposed on the touch driving electrodes 14. To further reduce the resistance of the touch sensing electrodes 15 and improve the conductivity thereof, a plurality of strip-shaped metal electrodes 17 can be disposed on the touch sensing electrodes 15.

In order not to affect the opening rate of the pixels and the light transmittance of the touch panel, preferably, the strip-shaped metal electrodes are located in the region corresponding to the black matrix.

The strip-shaped metal electrodes can be conductive electrodes of aluminum, molybdenum, silver and platinum and etc. with fine conductivity, or electrodes made of an alloy of at least two metals from aluminum, molybdenum, silver and platinum and etc.

Preferably, the touch driving electrodes and the touch sensing electrodes in the present invention can be separately disposed electrodes, or electrodes shared with other conductive film layers.

In one embodiment, when the liquid crystal display panel of the in-cell touch panel is a liquid crystal display panel in a TN (Twisted Nematic) mode or a VA (Vertical Alignment) mode, the common electrodes are provided on the first substrate, that is, the touch driving electrodes and the touch sensing electrodes are the common electrodes provided on the first substrate, or either the touch driving electrodes or the touch sensing electrodes are the common electrodes provided on the first substrate. The touch driving electrodes and the touch sensing electrodes are time-sharing driven. At an image display phase, a constant voltage ($V_{com}$) is applied to the touch driving electrodes and the touch sensing electrodes at the same time, and at a touch phase, a touch signal voltage of achieving the touch function is respectively applied to the touch driving electrodes and the touch sensing electrodes, and thereby the touch function is achieved.

In another embodiment, either the touch driving electrodes or the touch sensing electrodes are conductive black matrix. Specifically, the black matrix comprises a first portion distributed in a first direction and a second portion distributed in a second direction. The first portion or the second portion of the black matrix can be conductive. The touch driving electrodes can serve as the first portion of the conductive black matrix; and the touch sensing electrodes can serve as the second portion of the conductive black matrix. Or, the touch sensing electrodes can serve as the first portion of the conductive black matrix; and the touch driving electrodes can serve as the second portion of the conductive black matrix.

The touch panel provided by the embodiments of the present invention achieves the functions of image display and touch in a time-sharing driving manner, thus the present invention does not affect the touch panel on achieving the functions of image display and touch.

It needs to be indicated that, for the touch panel provided by the embodiments of the present invention, the first substrate and the functional structure thereon constitute the color filter substrate, and the second substrate is used for forming array substrate. The touch panel provided by the embodiments of the present invention is just intended to describe the touch driving electrodes and the touch sensing electrodes of the present invention. During specific implementation, the touch panel can comprise other functional structures, for example, an alignment film layer (PI layer) can be provided on the touch driving electrodes and the touch sensing electrodes.

The above description is made taking it as an example that the touch driving electrodes and the touch sensing electrodes are disposed on the first substrate (that is, the color filter substrate). The embodiment that the touch driving electrodes and the touch sensing electrodes are disposed on the second substrate (array substrate) will be described hereinafter.

The array substrate comprises a TFT pixel array, and the touch driving electrodes and the touch sensing electrodes of the present invention can be a layer of independently arranged electrodes or electrodes shared with other conductive film layers.

When the touch driving electrodes and the touch sensing electrodes are a layer of independently arranged electrodes, the touch driving electrodes and the touch sensing electrodes are insulated from the conductive film layer on the array substrate.

When the touch driving electrodes and the touch sensing electrodes are electrodes shared with other conductive film layers, the touch driving electrodes and the touch sensing electrodes can serve as the common electrodes provided on the array substrate. Or, either the touch driving electrodes or the touch sensing electrodes serve as the common electrodes provided on the array substrate.

It needs to be indicated that the display panel in which the common electrodes are provided on the array substrate can be a display panel in an IPS (In-Plane-Switching) mode or an ADS (Advanced Super Dimension Switch) mode.

Figure 8:
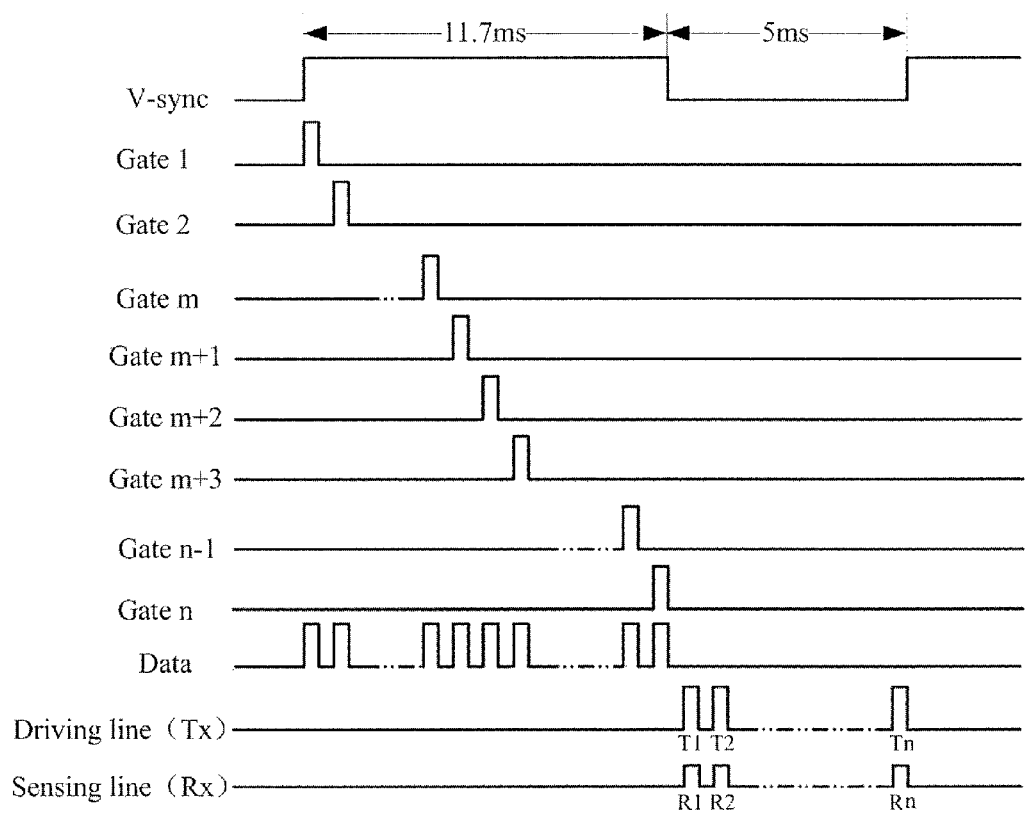
FIG. 8 is a time sequence diagram of the in-cell touch panel provided by the embodiment of the present invention achieving the touch function.

FIG. 8 is the time sequence diagram of achieving the image display and touch functions, and the working principle of the in-cell touch panel provided by the embodiment of the present invention will be specifically described.

In FIG. 8, V-sync is a time sequence signal. FIG. 8 also shows n gate lines, being respectively gate line 1 (Gate 1), gate line 2 (Gate 2), . . . , gate line m (Gate m), gate line m+1 (Gate m+1), gate line m+2 (Gate m+2), gate line m+3 (Gate m+3), gate line n−1 (Gate n−1) and gate line n (Gate n). The present invention also comprises data lines (Date), the time sequences of n touch driving electrodes (T1, T2, . . . , Tn) and the time sequences of n touch sensing electrodes (R1, R2, . . . , Rn).

Suppose the time of displaying one frame of image is 16.7 ms, as shown in FIG. 8, the first 11.7 ms are an image display period, and the last 5 ms are a touch period. During the first 11.7 ms, a gate voltage is applied to the gate lines sequentially, and a data signal is applied to the data lines sequentially to achieve image display. During the last 5 ms, a low level signal is applied to the gate lines and the data lines, so that the TFT connected with the gate lines is cut off. A certain touch driving voltage $V_1$ is applied to the touch driving electrodes Tx sequentially, and a constant voltage or alternating voltage $V_0$ is applied to the touch sensing electrodes at the same time. An electric field is formed between the touch sensing electrodes applied with the voltage $V_0$ and the touch driving electrodes applied with the voltage $V_1$ to achieve the touch function.

The 11.7 ms of the image display period and the 5 ms of the touch display period are just intended to describe an example of the present invention. During specific implementation, the image display period is not limited to 11.7 ms, and the touch display period is not limited to 5 ms.

The embodiments of the present invention further provide a display device comprising the above in-cell touch panel, and the display device can be display devices such as liquid crystal display, liquid crystal television, OLED panel, OLED display, OLED television and electronic paper.

It needs to be indicated that the in-cell touch panel provided by the embodiments of the present invention can be integrated in a liquid crystal display panel in the TN mode or in a liquid crystal display panel in the ADS (Advanced Super Dimension Switch) mode. The ADS mode is a plane electric field wide viewing angle core technology, and its core technical characteristics are described as follow: a multidimensional electric field is formed through the electric field generated at the edge of the slit electrodes in the same plane and the electric field generated between a slit electrode layer and a plate-shaped electrode layer, so that all orientation liquid crystal molecules between the slit electrodes in a liquid crystal box and right above the electrodes can rotate, and then the working efficiency of the liquid crystals is improved and the light transmittance is enhanced. The switch technology in the ADS mode can improve the picture quality of TFT-LCD products, and has advantages such as high resolution, high transmittance, low power consumption, wide viewing angle, high opening rate, low color chromatic aberration and no push Mura. For different applications, the improvements of the ADS technology comprise a high transmittance I-ADS technology, a high opening rate H-ADS and high resolution S-ADS technology and etc.

In an in-cell touch panel provided by the embodiment of the present invention, wherein, the touch driving electrodes and the touch sensing electrodes are provided on the color filter substrate and are provided at the same layer, the touch driving electrodes or the touch sensing electrodes comprise a plurality of independent electrode units, and adjacent electrode units are electrically connected in a bridging manner. The touch driving electrodes and the touch sensing electrodes can be provided on the color filter substrate. Thus, the pixel structure on the array substrate is not affected, and then the opening rate of the pixels is not affected.

Obviously one skilled in the art may make various modifications and variations to the present invention without departing from the spirits and scope of the present invention. Thus, if such variations and modifications to the present invention fall within the scope of the claims of the present invention and equivalent technologies thereof, the present invention shall also contain such modifications and variations.

The invention claimed is:

1. An in-cell touch panel, comprising a first substrate and a second substrate opposite to each other, wherein further comprising a plurality of first electrodes which extend in a first direction and are located at a side of the first substrate close to the second substrate, and a plurality of second electrodes which extend in a second direction crossing the first direction;
   the first electrodes and the second electrodes are disposed at the same layer and insulated from each other;
   wherein the first electrodes comprise a plurality of electrode units independent of each other, the electrode units and the second electrodes are arranged with an interval therebetween, and two electrode units which belong to the same first electrode and are located at both sides of the second electrodes are electrically connected through a bridge line.

2. The touch panel according to claim 1, further comprising a black matrix layer and a color resin layer located at the side of the first substrate close to the second substrate, and the first electrodes and the second electrodes are located between the first substrate and the black matrix layer, or between the black matrix layer and the color resin layer, or on the color resin layer.

3. The touch panel according to any of claim 2, wherein, the first electrodes are touch driving electrodes, the second electrodes are touch sensing electrodes, and the electrode units of the first electrodes are touch driving electrode units; or,
   the first electrodes are touch sensing electrodes, the second electrodes are touch driving electrodes, and the electrode units of the first electrodes are touch sensing electrode units.

4. The touch panel according to claim 2, wherein, the first electrodes and/or the second electrodes are provided with a plurality of strip-shaped metal electrodes.

5. The touch panel according to claim 4, further comprising a black matrix located at the side of the first substrate close to the second substrate, and the strip-shaped metal electrodes are located in a region corresponding to the black matrix.

6. The touch panel according to claim 5, wherein, the strip-shaped electrodes are aluminum, molybdenum, silver and platinum electrodes, or electrodes made of an alloy of at least two metals from aluminum, molybdenum, silver and platinum.

7. The touch panel according to claim 1, further comprising a black matrix located at the side of the first substrate close to the second substrate, and the bridge line is located in a region corresponding to the black matrix.

8. The touch panel according to any of claim 7, wherein, the first electrodes are touch driving electrodes, the second electrodes are touch sensing electrodes, and the electrode units of the first electrodes are touch driving electrode units; or,
   the first electrodes are touch sensing electrodes, the second electrodes are touch driving electrodes, and the electrode units of the first electrodes are touch sensing electrode units.

9. The touch panel according to claim 7, wherein, the first electrodes and/or the second electrodes are provided with a plurality of strip-shaped metal electrodes.

10. The touch panel according to claim 9, further comprising a black matrix located at the side of the first substrate close to the second substrate, and the strip-shaped metal electrodes are located in a region corresponding to the black matrix.

11. The touch panel according to claim 10, wherein, the strip-shaped electrodes are aluminum, molybdenum, silver and platinum electrodes, or electrodes made of an alloy of at least two metals from aluminum, molybdenum, silver and platinum.

12. The touch panel according to any of claim 1, wherein, the first electrodes are touch driving electrodes, the second electrodes are touch sensing electrodes, and the electrode units of the first electrodes are touch driving electrode units; or,
   the first electrodes are touch sensing electrodes, the second electrodes are touch driving electrodes, and the electrode units of the first electrodes are touch sensing electrode units.

13. The touch panel according to claim 12, wherein, the first electrodes and/or the second electrodes are provided with a plurality of strip-shaped metal electrodes.

14. The touch panel according to claim 13, further comprising a black matrix located at the side of the first substrate close to the second substrate, and the strip-shaped metal electrodes are located in a region corresponding to the black matrix.

15. The touch panel according to claim 1, wherein, the first electrodes and/or the second electrodes are provided with a plurality of strip-shaped metal electrodes.

16. The touch panel according to claim 15, further comprising a black matrix located at the side of the first substrate close to the second substrate, and the strip-shaped metal electrodes are located in a region corresponding to the black matrix.

17. The touch panel according to claim 16, wherein, the strip-shaped electrodes are aluminum, molybdenum, silver and platinum electrodes, or electrodes made of an alloy of at least two metals from aluminum, molybdenum, silver and platinum.

18. The touch panel according to claim 1, wherein, the first electrodes and the second electrodes are disposed on the first substrate, the touch panel further comprises common electrodes disposed on the first substrate, and the first electrodes and/or the second electrodes serve as common electrodes; or, the first electrodes and the second electrodes are disposed on the second substrate, the touch panel further comprises common electrodes disposed on the second substrate, and the first electrodes and/or the second electrodes serve as common electrodes.

19. The touch panel according to claim 1, further comprising a black matrix located at the side of the first substrate close to the second substrate, and the black matrix comprises a first portion distributed in a first direction and a second portion distributed in a second direction;

the first portion or the second portion of the black matrix can be conductive;

the first electrodes are the first portion of the conductive black matrix; or the second electrodes are the second portion of the conductive black matrix.

20. A display device comprising the touch panel according to claim 1.

21. An in-cell touch panel, comprising a first substrate and a second substrate opposite to each other, wherein further comprising a plurality of first electrodes which extend in a first direction and are located at a side of the second substrate close to the first substrate, and a plurality of second electrodes which extend in a second direction crossing the first direction;

the first electrodes and the second electrodes are disposed at the same layer and insulated from each other;

wherein the first electrodes comprise a plurality of electrode units independent of each other, the electrode units and the second electrodes are arranged with an interval therebetween, and two electrode units which belong to the same first electrode and are located at both sides of the second electrodes are electrically connected through a bridge line.

* * * * *